US008814083B2

(12) United States Patent
Lhermenault et al.

(10) Patent No.: US 8,814,083 B2
(45) Date of Patent: Aug. 26, 2014

(54) AIRCRAFT PROVIDED WITH A TAIL PLANE INCLUDING MEANS FOR COMBATING FLUTTER

(75) Inventors: Rodolphe Lhermenault, Cabries (FR); Thomas Meyer, Aix en Provence (FR); Jean Azeau, Fuveau (FR); Julien Guitton, Chateauneuf les Martigues (FR)

(73) Assignee: Airbus Helicopters, Marignane Cedex (FR)

( * ) Notice: Subject to any disclaimer, the term of this patent is extended or adjusted under 35 U.S.C. 154(b) by 147 days.

(21) Appl. No.: 13/274,544

(22) Filed: Oct. 17, 2011

(65) Prior Publication Data

US 2012/0138739 A1 Jun. 7, 2012

(30) Foreign Application Priority Data

Oct. 26, 2010 (FR) ...................... 10 04204

(51) Int. Cl.
*B64C 9/00* (2006.01)
(52) U.S. Cl.
USPC .......... 244/87; 244/17.11; 244/117; 244/119; 244/120
(58) Field of Classification Search
USPC ...................... 244/87, 17.11, 117 R, 119, 120
See application file for complete search history.

(56) References Cited

U.S. PATENT DOCUMENTS

| 2,113,000 | A | * | 4/1938 | Rowe ......................... 244/99.13 |
| 2,981,504 | A | * | 4/1961 | Parker ....................... 244/117 R |
| 3,448,946 | A | * | 6/1969 | Nagatsu ..................... 244/17.19 |
| 4,227,665 | A | * | 10/1980 | Carlson et al. ................ 244/210 |
| 4,708,305 | A | * | 11/1987 | Kelley et al. .............. 244/17.19 |
| 5,209,430 | A | * | 5/1993 | Wilson et al. .............. 244/17.19 |
| 5,377,934 | A | * | 1/1995 | Hill ............................ 244/17.11 |
| D363,054 | S | * | 10/1995 | Taylor et al. ................ D12/327 |
| 5,498,129 | A | * | 3/1996 | Dequin et al. ............. 415/209.3 |
| D375,077 | S | * | 10/1996 | Taylor et al. ................ D12/327 |
| 5,641,133 | A |   | 6/1997 | Toossi |
| 6,053,452 | A | * | 4/2000 | Yamakawa et al. ........ 244/17.19 |
| 6,655,635 | B2 | * | 12/2003 | Maury et al. .................. 244/131 |

(Continued)

FOREIGN PATENT DOCUMENTS

| EP | 1834873 A1 | 9/2007 |
| FR | 2915173 A1 | 10/2008 |
| WO | 9958872 A1 | 11/1999 |

OTHER PUBLICATIONS

Search Report and Written Opinion; Application No. FR 1004204; dated Jun. 14, 2011.

*Primary Examiner* — Isam Alsomiri
*Assistant Examiner* — Assres H Woldemaryam
(74) *Attorney, Agent, or Firm* — Brooks Kushman P.C.

(57) ABSTRACT

An aircraft (1) provided with a tail boom (4) including a tail plane (100) provided with an airfoil surface (5), the airfoil surface (5) being provided with at least one stabilizer portion (11, 12) extending laterally outside the tail boom (4) and with a central portion (13) extending inside the tail boom (4), said stabilizer portion (11, 12) being implanted in an orifice (6, 7) of the tail boom (4) that is defined by a peripheral wall (6', 7'), clearance (21, 22) existing between said stabilizer portion (11, 12) and said peripheral wall (6, 7). The aircraft includes combating means (30) for combating the flutter phenomenon, which means are provided with stiffener means (31, 32) exerting predetermined compressive stress on said stabilizer portion (11, 12), said stiffener means (31, 32) being arranged at the root of the stabilizer portion (11, 12).

17 Claims, 2 Drawing Sheets

(56) References Cited

U.S. PATENT DOCUMENTS

| | | |
|---|---|---|
| 6,986,695 B2 * | 1/2006 | Frontera Castaner .......... 446/34 |
| 7,625,623 B2 * | 12/2009 | Grose et al. .................. 428/119 |
| 7,770,846 B2 * | 8/2010 | Perez Rodriguez et al. .. 244/209 |
| 8,074,920 B2 * | 12/2011 | Mikulla ..................... 244/17.19 |
| 8,177,169 B2 * | 5/2012 | Lobo Barros et al. ........ 244/131 |
| 8,191,825 B2 * | 6/2012 | Ramirez Blanco et al. .... 244/87 |
| 8,210,468 B2 * | 7/2012 | Desroche ................... 244/17.11 |
| 2004/0124311 A1 * | 7/2004 | Kordel et al. ................. 244/131 |
| 2005/0106987 A1 * | 5/2005 | Frontera Castaner .......... 446/34 |
| 2008/0128553 A1 | 6/2008 | Brown |
| 2010/0163672 A1 * | 7/2010 | Ramirez Blanco et al. .... 244/87 |
| 2010/0243810 A1 * | 9/2010 | Lobo Barros et al. ........ 244/131 |

* cited by examiner

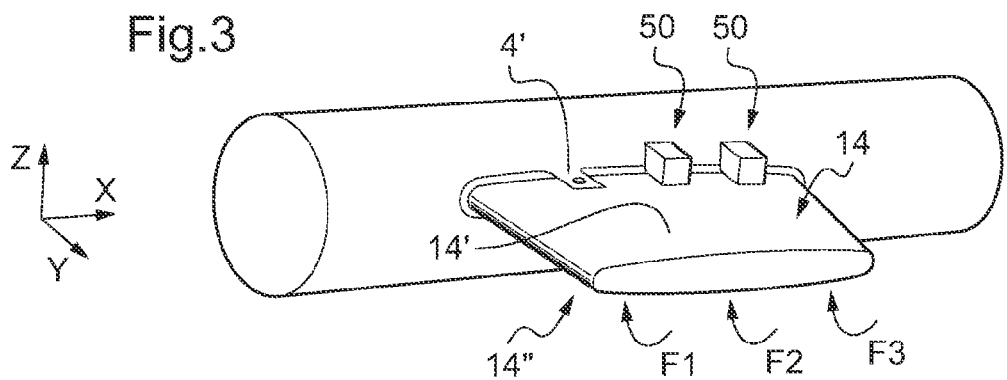
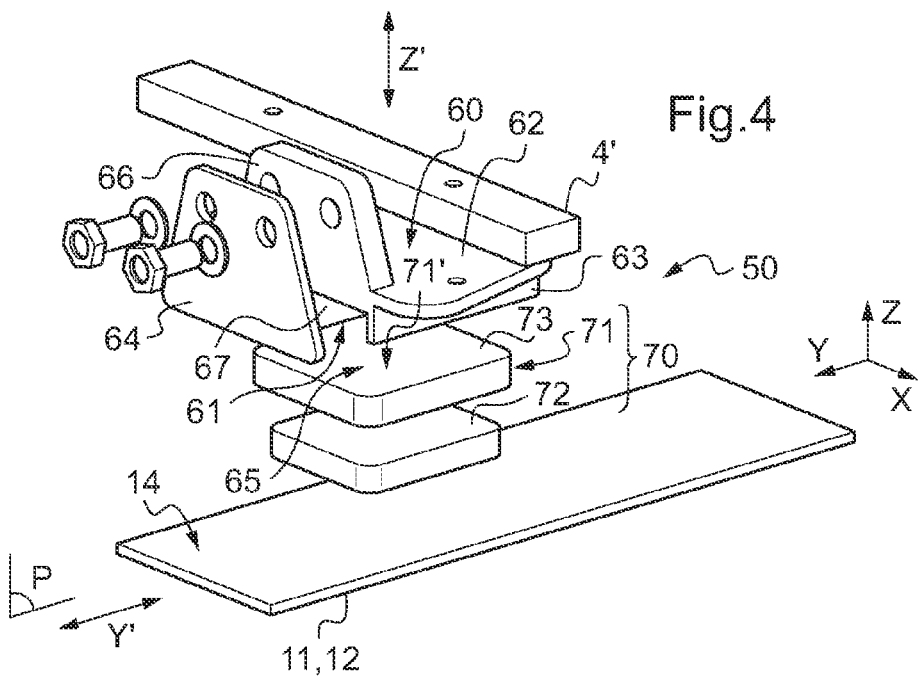
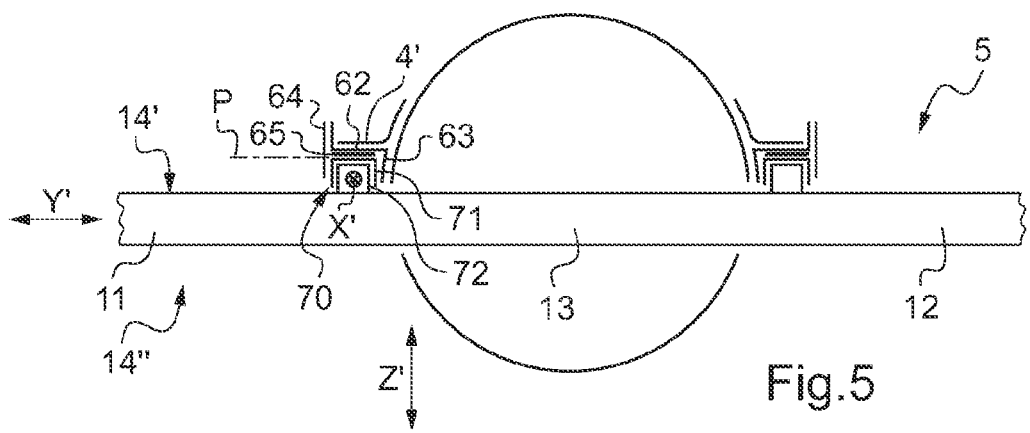

AIRCRAFT PROVIDED WITH A TAIL PLANE INCLUDING MEANS FOR COMBATING FLUTTER

CROSS REFERENCE TO RELATED APPLICATIONS

This application claims priority to FR 10 04204 filed on Oct. 26, 2010, the disclosure of which is incorporated in its entirety by reference herein.

BACKGROUND OF THE INVENTION (1) Field of the Invention

The present invention relates to an aircraft provided with a tail plane including means for combating flutter.

(2) Description of Related Art

It is common practice to provide the tail zone of an aircraft with stabilizer members, referred collectively as a tailplane. For example, it is known to arrange on a tail boom a first tail member that is substantially vertical relative to the aircraft and a second tail member that is substantially horizontal relative to the aircraft, when on the ground. Under such circumstances, the first tail member is conventionally referred to as a "tail fin" or "lateral stabilizer", with the second tail member conventionally being referred to as a "tail plane" or indeed a "horizontal stabilizer".

The tail plane may comprise an airfoil surface passing right through the tail boom in a transverse direction. The airfoil surface then has a first stabilizer portion and a second stabilizer portion extending on either side of the tail boom, and optionally a central portion extending inside the tail boom, the central portion connecting the first portion to the second portion. Such a tail plane is sometimes referred to below as a "through" tail plane insofar as the airfoil surface includes an element passing through the tail boom.

Under such circumstances, the tail boom has first and second orifices, each arranged in a respective side wall of the tail boom. In order to position the tail plane, the airfoil surface is inserted through the tail boom via the first orifice, the airfoil surface then passing out through the second orifice until it reaches its final position. It can be understood that first assembly clearance is provided between the first portion of the airfoil surface and the first orifice, and that second assembly clearance is provided between the second portion of the airfoil surface and the second orifice.

Furthermore, fastener systems are used to keep the airfoil surface in position relative to the tail boom.

The fastener system is then provided with at least one projecting rim of the dropped edge type in register with each stabilizer portion of the airfoil surface or with a metal fitting. The projecting rim then co-operates with screw-fastener means for fastening the tail plane.

Among the aerodynamic phenomena encountered by a tail plane in flight, there is the phenomenon of aeroelastic flutter, commonly referred to simply as "flutter", which phenomenon is caused by the stream of air moving around the tail plane.

In order to understand the phenomenon, it is important firstly to realize that even in the absence of vibration, a tail plane is subjected to variation in twisting moments in each of its sections due to vertical movement of the tail plane, and consequently it is subjected to variation in lift. This observation remains when vibration is also present.

It should be recalled that a tail plane has its own natural modes of vibration both in flapping and in twisting. In particular, these are a natural mode of vibration symmetrical flapping, a natural mode of vibration asymmetrical flapping, a natural mode of vibration symmetrical twisting, and a natural mode of vibration asymmetrical twisting. The adjective "symmetrical" is used of a natural mode of vibration when the first stabilizer portion and the second stabilizer portion of the airfoil surface are vibrating in phase, while the adjective "asymmetrical" is used when the first stabilizer portion and the second stabilizer portion of the airfoil surface are vibrating in phase opposition.

The flutter phenomenon may occur when the natural frequency of a natural mode of vibration in flapping and the natural frequency of a natural mode of vibration in twisting come close together under the effect of aerodynamic stresses. The term "frequency" is used below for convenience to designate the natural frequency of a natural mode of vibration.

This constitutes an alarming situation that may be encountered when the speed of an aircraft increases so as to become relatively high. When said speed reaches a critical speed, also referred to as the flutter speed, the damping of the natural mode of vibration in flapping and/or of the natural mode of vibration in twisting, as provided by the airstream runs the risk of becoming negative. Under such circumstances, a stabilizer portion of the tail plane runs the risk of being excited at a frequency of vibration in flapping or in twisting that is close to said first and second frequencies. The stabilizer portion then deforms in a natural mode of vibration in flapping and a natural mode of vibration in twisting. It is important to understand that this phenomenon is likely to diverge, i.e. to vary rapidly and lead to an explosion of the stabilizer portion concerned.

In other words, the tail plane vibrates in a vertical plane while simultaneously performing vertical movement in twisting. These two movements together, coupled with the airstream that represents a source of energy, can lead to dynamic instability. The twisting excites flapping, and flapping then reinjects energy into twisting. The flapping and twisting modes of vibration become amplified giving rise to said dynamic instability or "flutter". This phenomenon is very dangerous, with the tail plane often breaking quite suddenly, making it impossible to carry out any avoidance maneuver.

In order at least to limit the risk of breakage due to flutter in a stabilizer portion of a tail plane, it is possible to introduce damping. Damping may be provided by means of a suspended mass arranged at a free end of a stabilizer portion or by means of a damping material, for example, in order to prevent the damping in question going negative in the authorized range of speeds for the aircraft.

Nevertheless, it can be difficult to demonstrate that a damping scheme is effective over time, i.e. that it guarantees some minimum level of damping. In addition, it is clear that any solution that consists in adding mass penalizes the aircraft from a weight point of view.

Under such circumstances, it is also possible to envisage modifying the actual structure of the tail plane. However, that technique can be expensive if it is desired to optimize existing aircraft, insofar as it involves replacing the tail planes in question.

SUMMARY OF THE INVENTION

An object of the present invention is thus to provide an aircraft provided with an optimized tail plane presenting at least reduced probability of being exposed to the above-mentioned flutter phenomenon, without requiring an existing tail plane to be redimensioned.

It may be observed that the technological background includes the following documents in particular: FR 2 915 173, US 2008/0128553, and EP 1 834 873.

Document FR 2 915 173 proposes attaching a lift member to a fuselage via a resilient hinge.

Document US 2008/0128553 describes a method of joining together members made of composite material.

Finally, document EP 1 834 873 describes an optimized tail plane.

The following documents are also known: US 2010/163672A1; US 2010/243810A1; U.S. Pat. No. 5,209,430A; WO 99/58872A1; and U.S. Pat. No. 5,641,133A.

According to the invention, an aircraft is provided with a tail boom extending in a longitudinal direction, the tail boom including a tail plane provided with an airfoil surface extending in a transverse direction, the airfoil surface being provided with at least one stabilizer portion extending laterally outside the tail boom and with a central portion extending inside the tail boom, the stabilizer portion being implanted in an orifice of the tail boom that is defined by a peripheral wall, clearance then existing between the stabilizer portion and the peripheral wall. The tail plane is a horizontal type stabilizer seeking to stabilize the movements of the aircraft, in particular in pitching and in roll.

It is recalled that the term "horizontal" when applied to a tail plane is used in contrast to the term "vertical" and should be understood broadly. Each stabilizer portion may present a certain angle of inclination or incidence relative to a horizontal reference.

The aircraft is remarkable in that it includes means for combating the flutter phenomenon, which combating means are provided with stiffener means exerting predetermined compressive stress on the stabilizer portion, the stiffener means being arranged at the root of the stabilizer portion, i.e. at the interface between the stabilizer portion and the tail boom, and thus in said clearance.

The stabilizer portion presents given stiffness, and the stiffener means may be dimensioned to increase the given stiffness by at least 20% in twisting in order to obtain a significant increase in stability margin.

In particular, the stiffener means should be dimensioned to have a significant effect on the frequencies that are to be treated, e.g. of the order of 10% on frequencies close to 20 hertz (Hz).

The stiffener means then shift the frequency of a natural mode of vibration in twisting so as to move it away from the frequency of a natural mode of vibration in flapping. That then limits or even eliminates the risk of destructive coupling appearing between the natural mode of vibration in flapping and the natural mode of vibration in twisting.

The stiffener means are thus effective. Furthermore, there is no need to modify an existing tail plane in order to fit said means, i.e. said means may be applied to existing aircraft, and in particular to rotorcraft and more particularly to helicopters.

It should be observed that the stiffener means are easy to maintain insofar as maintenance consists in particular in an operation that seeks merely to verify that the stiffener means are in contact with the stabilizer portion.

The combating means of the invention may also include one or more of the following characteristics.

In a first embodiment, the stiffener means may include a filler material arranged in the clearance between a stabilizer portion of the associated peripheral wall that surrounds the stabilizer portion, the filler material having predetermined stiffness that is independent of ambient temperature.

By way of example, the predetermined stiffness may be dynamic stiffness in compression that is greater than or equal to 20 decanewtons per millimeter (daN/mm) in the context of a filler material that is spread all around the periphery of the stabilizer portion.

The filler material is then arranged between the tail boom and the stabilizer portion that is to be treated so as to stiffen said stabilizer portion at its root. The filler material advantageously covers the entire periphery of a section of the stabilizer portion.

Although the filler material also performs a sealing gasket function, it should be understood that the filler material need not necessarily be a sealing material. On the contrary, it must present stiffness that is predetermined, by testing or by calculation, so as to enable it to stiffen the stabilizer portion sufficiently to shift appropriately the frequency of the natural mode of vibration in twisting, in question. Furthermore, the stiffness is stable over time and with variation in outside temperature. Unlike a sealing material, the filler material retains its properties at high temperature.

The filler material may be of the "mastic" type or indeed it may comprise an expansive foam, for example.

In a second embodiment, the stiffener means of a stabilizer portion comprise at least two tabs exerting compression stress on the stabilizer portion; each tab being in contact with an outer covering of the stabilizer portion and the tail boom.

By way of example, the tab is arranged in register with a structural member of the stabilizer portion, in register with a spar or a rib, for example.

Such a tab may optionally be provided with means for fastening it to the tail boom, and attached to a projecting rim of said tail boom, for example. The fastener means receive in a housing a stiffener that is compressed between the fastener means and a stabilizer portion, the stiffener then being in contact with the stabilizer portion.

The stiffener then acts as a spacer exerting pressure on the outer covering of the stabilizer portion in order to modify the frequency of at least one natural mode of vibration in twisting that needs to be treated in said stabilizer portion.

In order to install the tab, an operator fastens the fastener means to the tail boom and then slides the stiffener between the fastener means and the stabilizer portion in order to place the stiffener in its housing.

The housing is then open sideways at least in part so as to enable the stiffener to be put into place. Nevertheless, it may be useful to lock the stiffener so as to hold it correctly in position in flight.

Thus, the stiffener may be locked in the housing in an elevation direction by a fastener plate of the fastener means and by the stabilizer portion, and in a plane contained between the fastener plate and the stabilizer portion by a side edge of the fastener means and by closure means, the side edge extending from the fastener plate towards the stabilizer portion without reaching the stabilizer portion, the closure means being removable and co-operating with the fastener means.

Under such circumstances, once inserted in the housing, the stiffener is locked in elevation by the fastener plate and the stabilizer portion, and is locked laterally by the side edge. Nevertheless, it can be understood that a side opening of the housing is not closed by the side wall, so as to allow the stiffener to be inserted in the housing. Consequently, when the stiffener is in position, the side opening is closed using the closure means, e.g. a plate screwed onto the fastener means.

Furthermore, the stiffener means may optionally be provided with adjustment means suitable for being arranged between the stiffener and a fastener plate of the fastener means.

The adjustment means may for example comprise removable spacers for adjusting the elevation position of the stiffener and consequently the stiffness of the stabilizer portion.

In addition, the stiffener optionally includes contact means pressing against the outer covering of the stabilizer portion.

In a first variant, said stiffener includes rigid contact means for making contact with the stabilizer portion.

In a preferred, second variant, said stiffener comprises prestressed contact means to present determined stiffness, e.g. flexible contact means made using a material taken from the category of elastomers.

The flexible contact means present stiffness that may be less than the stiffness of rigid contact means, but they limit the risk of damaging the stabilizer portion locally.

Furthermore, the stiffener may include contact means and slide means, the slide means facilitating arranging the stiffener in the housing, and the contact means bearing against the stabilizer portion.

It may be difficult to wedge the contact means of the stiffener between the fastener means and the stabilizer portion. The use of slide means makes it easier to insert the contact means of the stiffener in the housing provided for that purpose.

Such slide means may comprise a receptacle receiving the contact means, the contact means projecting from the receptacle, the receptacle having a coefficient of friction that is optimized to facilitate putting the stiffener into place.

For example, the stiffener may possess a rigid receptacle made of metal or of composite material with flexible contact means projecting therefrom.

In another aspect, the airfoil surface is provided with a first stabilizer portion and with a second stabilizer portion extending on either side of the tail boom together with a central portion extending inside the tail boom to interconnect the first and second stabilizer portions, first clearance extending between the first stabilizer portion and a first peripheral wall of the tail boom and second clearance extending between the second stabilizer portion and a second peripheral wall of the tail boom, first stiffener means being arranged in the root zone of the first stabilizer portion and second stiffener means being arranged in the root zone of the second stabilizer portion.

Each stiffener means then presents one or more of the characteristics described above.

BRIEF DESCRIPTION OF THE DRAWINGS

The invention and its advantages appear in greater detail from the following description of embodiments given by way of illustration with reference to the accompanying figures, in which:

FIG. 3 is a diagrammatic section showing a second embodiment; and

FIGS. 4 and 5 are an exploded view and a section view showing the elements of stiffener means in a preferred variant of the second embodiment.

DETAILED DESCRIPTION OF THE PREFERRED EMBODIMENTS

Elements that are present in more than one of the figures are given the same references in each of them.

Three mutually orthogonal directions labeled X, Y, and Z are shown in the figures.

The first direction X is said to be "longitudinal" insofar as the aircraft shown extends longitudinally from a front end towards a rear end in this first direction.

The second direction Y is said to be "transverse", and the third direction Z is said to be in "elevation".

Figure 1:
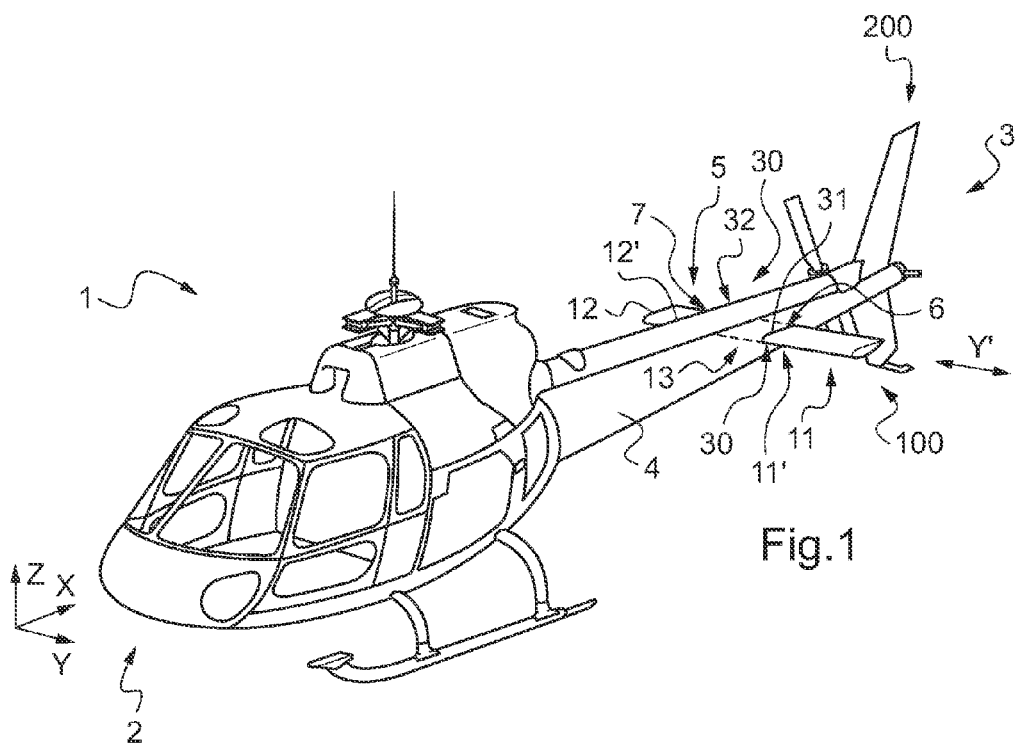
FIG. 1 is a view of an aircraft provided with a tail of the invention.

FIG. 1 shows an aircraft extending from a front end 2 to a rear end 3 along the longitudinal direction X.

The aircraft 1 is a helicopter having a tail boom 4 extending longitudinally in the first direction X. The tail boom 4 carries a horizontal tail plane 100 and a vertical tail fin 200, the tail plane 100 serving in particular to stabilize movements of the aircraft 1 in pitching and in roll. It is recalled that this tail plane may be inclined relative to the XY plane without going beyond the ambit of the invention.

The invention seeks to minimize the phenomenon of aeroelastic flutter with which the tail plane 100 may be confronted. It can thus be understood that the tail boom 4 could be a structure of an aircraft of the airplane type without going beyond the ambit of the invention.

The horizontal tail plane 100 is referred to below as the "tail plane", for short. The tail plane 100 has a stabilizer surface 5 extending in a transverse direction Y' parallel to the second direction Y.

The stabilizer surface includes at least one stabilizer portion that extends laterally outside the tail boom 4 and a central portion 13 that extends inside the tail boom 4.

Each stabilizer portion is implanted via a root zone in an orifice in the tail boom 4 that is defined by a peripheral wall. It can be understood that clearance lies between each stabilizer portion and the corresponding peripheral wall.

With reference to FIG. 1, the tail plane may then be of the through type, comprising in succession from one free end to the other: a first stabilizer portion 11 extending on a first side of the tail boom 4, a central portion 13 arranged inside the tail boom 4, and then a second stabilizer portion 12 extending on a second side of the tail boom 4.

The first stabilizer portion 11 is implanted via its root zone 11' in a first orifice 6 in the tail boom 4 that is defined by a peripheral wall, with first clearance lying between the first stabilizer portion 11 and the corresponding peripheral wall. Similarly, the second stabilizer portion 12 is implanted via its root zone 12' in a second orifice 7 in the tail boom 4 that is defined by a peripheral wall, with second clearance lying between the second stabilizer portion 12 and the corresponding peripheral wall.

The aircraft 1 then includes combating means 30 for combating flutter in order at least to limit the risk of this phenomenon appearing. The combating means 30 comprise respective stiffener means 31, 32 in each of the stabilizer portions to be treated, each stiffener means exerting a predefined compressive stress on the associated stabilizer portion 11, 12.

Each stiffener means 31, 32 is then in contact with the root zone of the corresponding stabilizer portion 11, 12.

Thus, first stiffener means 31 are arranged in the first root zone 11' of the first stabilizer portion 11 in the tail boom 4, and second stiffener means 32 are arranged in the second root zone 12' of the second stabilizer portion 12 in the tail boom 4.

By exerting pressure on a stabilizer portion, stiffener means serve to shift the frequency of a natural load in twisting of the stabilizer portion relative to the frequency of a natural mode in flapping vibration of said stabilizer portion.

Figure 2:
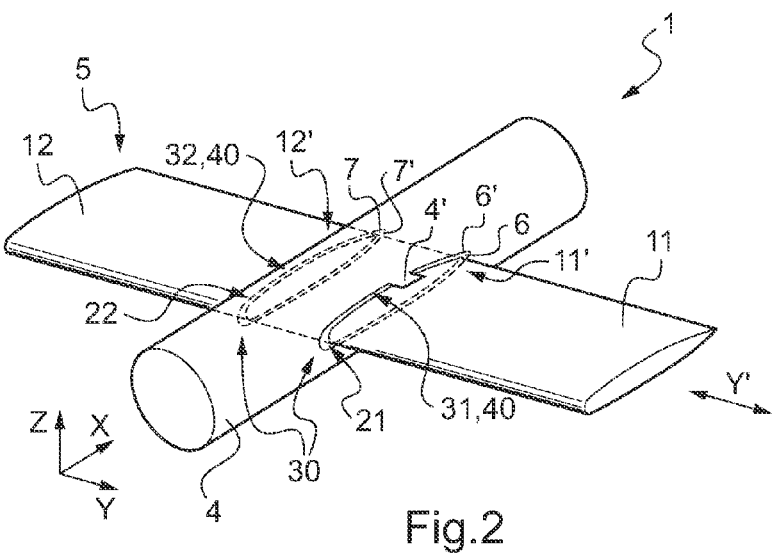
FIG. 2 is a diagrammatic view showing a first embodiment.

FIG. 2 is a diagrammatic view showing a first embodiment.

In this first embodiment, each stiffener means 31, 32 comprises a filler material 40 of predetermined stiffness that is independent of ambient temperature. This filler material is then arranged in the clearance 21, 22 between a stabilizer portion 11, 12 and the associated peripheral wall 6', 7' that surrounds said stabilizer portion 11, 12. The filler material fills all of this clearance, coming into contact with the tail boom and with the associated stabilizer portion.

It should be observed that in order to maintain the stabilizer surface in position in the transverse direction Y', the tail boom may include at least one dropped edge 4' with fastener means, e.g. of the bolt type, co-operating with said dropped edge and the stabilizer surface.

With reference to FIG. 3, in a second embodiment, the stiffener means for a stabilizer portion 11, 12 comprise at least two tabs 50 pressing against the stabilizer portion 11, 12. Each tab is then wedged between the outer covering 14 of the stabilizer portion 11, 12 and the tail boom 4.

For example, two tabs are pressed against the suction side surface 14' of the stabilizer portion, and three tabs are pressed against the pressure side surface 14" of the stabilizer portion at the locations marked by arrows F1, F2, and F3.

The first and second embodiments may be combined, with a stabilizer portion co-operating both with a plurality of tabs and with a filler material.

With reference to FIG. 4, each tab includes fastener means 60 for fastening to a rim that projects locally from the tail boom.

The fastener means 60 comprise a fastener plate 62. The fastener plate 62 receives on a first face attachment means 66 rising in elevation in an elevation direction Z' orthogonal to the transverse direction Y' in order to co-operate with closure means 64. Furthermore, a second face of the fastener plate 62 is secured to a side edge 63 extending in elevation towards the associated stabilizer portion 11, 12 in the elevation direction Z' in order to define a housing 61 suitable for receiving a stiffener 70. The stiffener 70 is then compressed between the fastener means 60 and the associated stabilizer portion 11, 12.

The assembly comprising the fastener plate 62, the attachment means 66, and the side edge 63 optionally forms a single part obtained by welding or by machining, for example.

In order to arrange a tab on the aircraft, the airfoil surface 5 is positioned and the fastener means 60 are fastened. The stiffener 70 is then slid into its housing 61 via a side opening 67 of said housing. Finally the side opening 67 is closed by the closure means 64 being fastened to the attachment means 66 of the fastener means.

With reference to FIG. 5, the stiffener 70 is then locked in place in its housing 61.

The stiffener 70 has no freedom to move in the elevation direction Z' since it is sandwiched between the fastener means 60 and the stabilizer portion 11, 12, and more particularly between the fastener plate 62 and the outer covering 14' of the stabilizer portion.

Furthermore, the stiffener 70 has no freedom to move in the plane P contained between the elements that lock the stiffener 70 in elevation, i.e. the plane P contained between the fastener plate 62 and the outer covering 14' of the stabilizer portion.

It can be seen that the stiffener is locked by the side edge in a longitudinal direction X' of said plane P, and by the side edge and the closure plate in a transverse direction Y' of said plane P.

In the example shown, the housing 61 then comprises:
a top face that is closed by the fastener plate;
a bottom face that is closed by the outer covering;
a first side face facing the tail boom 4, and two side faces adjacent to said first side face that are closed by the side edge; and
a second side face parallel to the first side face that is closed by the closure plate.

Furthermore, FIG. 4 shows that a tab may include adjustment means 65 arranged between the stiffener 70 and the fastener means 60, and in particular between the stiffener 70 and the fastener plate 62. The adjustment means may include one or more spacers serving to adjust the stiffness delivered by the stiffener to the stabilizer portion by adjusting the position of the stiffener in the elevation direction Z'.

Furthermore, the stiffener includes contact means 72 for coming into contact with the stabilizer portion in order to stiffen it.

It should be observed that the device is relatively easy to inspect. A simple inspection consists in particular in verifying visually that the contact means 72 is indeed in contact with the stabilizer portion.

The contact means may be rigid and may possess stiffness of at least 50 daN/mm in dynamic stiffness in compression at the frequency that is to be treated, for example.

Conversely, in order to guarantee that the contact between the contact means 72 and the stabilizer portion does not run the risk of damaging the stabilizer portion in flight, the contact means may be flexible.

In a first variant that is not shown in the figures, the stiffener 70 includes contact means only.

In a second variant as shown, the stiffener comprises contact means 72 and slide means 71 for encouraging the arrangement of the contact means in the housing.

The slide means are particularly advantageous but not essential for the purpose of sliding the contact means made of prestress elastomer into the dedicated housing.

The slide means 71 comprise a slide face 71' suitable for being interposed between the contact means and the fastener plate 62. For example, the slide means may be a receptacle receiving the contact means 72.

With reference to FIG. 5, it can be seen that the contact means 72 project from the receptacle in order to be in contact with the stabilizer portion.

Furthermore, it should be observed that the side edge 63 of the fastener means does not reach the stabilizer portion, since the receptacle projects from said side edge.

Naturally, the present invention may be subjected to numerous variants as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An aircraft comprising:
a tail boom extending in a longitudinal direction, the tail boom including a tail plane provided with an airfoil surface extending in a transverse direction;
at least one stabilizer portion provided with the airfoil surface and extending laterally outside the tail boom and with a central portion extending inside the tail boom, the stabilizer portion being implanted in an orifice defined by a peripheral wall of the tail boom;
a clearance existing between the stabilizer portion and the peripheral wall;
combating means for combating the phenomenon of flutter, which combating means are provided with stiffener means arranged in the clearance; and
at least two tabs included on the stiffener means for exerting compression stress on the stabilizer portion; each tab being in contact with an outer covering of the stabilizer portion and the tail boom, each tab being provided with fastener means receiving in a housing,
wherein the stiffener means is compressed between the fastener means and the stabilizer portion, the stiffener means then being in contact with the at least one stabilizer portion, the stiffener means being locked in the housing in an elevation direction by a fastener plate of the fastener means and by the stabilizer portion, and in a plane contained between the fastener plate and the stabilizer portion by a side edge of the fastener means and by closure means, the side edge extending from the fastener plate towards the stabilizer portion without reaching the stabilizer portion, said closure means being removable and co-operating with said fastener means,
wherein the two tabs are spaced apart in the longitudinal direction.

2. The aircraft according to claim 1, wherein said stiffener means include a filler material arranged in the clearance between a stabilizer portion of the associated peripheral wall, wherein the filler material surrounds said stabilizer portion, said filler material having predetermined stiffness is independent of ambient temperature.

3. The aircraft according to claim 1, wherein said stiffener means are provided with adjustment means suitable for being arranged between said stiffener and a fastener plate of said fastener means.

4. The aircraft according to claim 1, wherein said stiffener includes rigid contact means for making contact with the stabilizer portion.

5. The aircraft according to claim 1, wherein said stiffener comprises contact means prestressed to present determined stiffness.

6. The aircraft according to claim 1, wherein said stiffener includes slide means and contact means, said slide means facilitating arranging the stiffener in said housing, and said contact means bearing against the stabilizer portion.

7. The aircraft according to claim 6, wherein said slide means comprise a receptacle receiving said contact means, said contact means projecting from said receptacle.

8. The aircraft according to claim 1, wherein said airfoil surface is provided with a first stabilizer portion and with a second stabilizer portion extending on either side of the tail boom together with a central portion extending inside the tail boom to interconnect the first and second stabilizer portions, first clearance extending between said first stabilizer portion and a first peripheral wall of the tail boom and second clearance extending between said second stabilizer portion and a second peripheral wall of the tail boom, said aircraft including respective stiffener means for each stabilizer portion, first stiffener means being arranged in the first clearance of the first stabilizer portion and second stiffener means being arranged in the second clearance of the second stabilizer portion.

9. An aircraft comprising:
a tail boom extending in a longitudinal direction from an aircraft body and defined by a peripheral wall having an orifice extending in a transverse direction through the tail boom;
at least one tail plane stabilizer having an airfoil surface and extending transverse to the tail boom in the transverse direction through the orifice;
a clearance region defined between the tail plane stabilizer and the peripheral wall; and
a stiffening device positioned in the clearance region for combating flutter of the tail plane stabilizer, the stiffening device including two tabs exerting compression stress on the tail plane stabilizer, each tab being received in a housing and being in contact with an outer covering of the tail plane stabilizer and the tail boom, each tab including a stiffener portion compressed between a fastener and the tail plane stabilizer such that the stiffener portion is in contact with the tail plane stabilizer and locked in the housing in an elevation direction between the fastener and the tail plane stabilizer, and the stiffener portion is locked in the transverse direction between the fastener and a removable closure,
wherein the two tabs are positioned on an upper suction side surface of the tail plane stabilizer.

10. The aircraft according to claim 9, further comprising a filler material arranged in the clearance the filler material having predetermined stiffness that is independent of ambient temperature.

11. The aircraft according to claim 9, wherein the stiffening device is provided with adjustment means suitable for being arranged between the stiffener and a fastener plate of the fastener.

12. The aircraft according to claim 9, wherein the stiffener portion includes rigid contact portion for making contact with the tail plane stabilizer, wherein the contact portion is prestressed to a pre-determined stiffness.

13. The aircraft according to claim 12, wherein the housing defines a receptacle for receiving the stiffener portion, and wherein the contact portion projects from the receptacle to contact the tail plane stabilizer.

14. The aircraft according to claim 9, wherein the tail plane stabilizer includes a first stabilizer portion provided on a first side of the tail boom, a central portion extending inside the tail boom, and a second stabilizer portion provided on a second side of the tail boom, and
wherein the clearance region includes a first clearance region extending between the first stabilizer portion and a first peripheral wall of the tail boom and second clearance region extending between the second stabilizer portion and a second peripheral wall of the tail boom, the aircraft including first and second stiffening devices for each of the first and second stabilizer portions, first stiffening device being arranged in the first clearance region and the second stiffening device being arranged in the second clearance region of the second stabilizer portion.

15. The aircraft according to claim 9, wherein the two tabs are spaced apart in the longitudinal direction.

16. An aircraft comprising:
a tail boom extending in a longitudinal direction from an aircraft body and defined by a peripheral wall having an orifice extending in a transverse direction through the tail boom;
at least one tail plane stabilizer having an airfoil surface and extending transverse to the tail boom in the transverse direction through the orifice;
a clearance region defined between the tail plane stabilizer and the peripheral wall; and
a stiffening device positioned in the clearance region for combating flutter of the tail plane stabilizer, the stiffening device including two tabs positioned on an upper pressure side of the tail plane stabilizer and exerting compression stress on the tail plane stabilizer, each tab being received in a housing and being in contact with an outer covering of the tail plane stabilizer and the tail boom, each tab including a stiffener portion compressed between a fastener and the tail plane stabilizer such that the stiffener portion is in contact with the tail plane stabilizer and locked in the housing in an elevation direction between the fastener and the tail plane stabilizer, and the stiffener portion is locked in the transverse direction between the fastener and a removable closure,
wherein the stiffening device further comprises at least two additional tabs positioned on a lower pressure side surface of the tail plane stabilizer.

17. The aircraft according to claim 1, wherein the stiffener means further comprises at least two additional tabs positioned on a lower pressure side surface of the tail plane stabilizer.

* * * * *